United States Patent
Inagaki et al.

(10) Patent No.: US 8,010,771 B2
(45) Date of Patent: Aug. 30, 2011

(54) COMMUNICATION SYSTEM FOR CONTROLLING INTERCOMMUNICATION AMONG A PLURALITY OF COMMUNICATION NODES

(75) Inventors: Takeshi Inagaki, Sagamihara (JP); Aya Minami, Fujisawa (JP); Yohichi Miwa, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 981 days.

(21) Appl. No.: 11/566,307

(22) Filed: Dec. 4, 2006

(65) Prior Publication Data

US 2007/0133580 A1 Jun. 14, 2007

(30) Foreign Application Priority Data

Dec. 6, 2005 (JP) ................................. 2005-351415

(51) Int. Cl.
*G06F 15/76* (2006.01)
*G06F 17/50* (2006.01)
(52) U.S. Cl. .......................................... 712/11; 716/117
(58) Field of Classification Search .................... 712/11, 712/12; 716/117
See application file for complete search history.

(56) References Cited

U.S. PATENT DOCUMENTS

| | | | | |
|---|---|---|---|---|
| 5,577,262 A | * | 11/1996 | Pechanek et al. | 712/11 |
| 5,715,391 A | * | 2/1998 | Jackson et al. | 712/11 |
| 5,748,942 A | * | 5/1998 | Duncan | 716/12 |
| 6,023,753 A | * | 2/2000 | Pechanek et al. | 712/18 |
| 2002/0016901 A1 | * | 2/2002 | Carvey et al. | 712/1 |
| 2002/0078322 A1 | * | 6/2002 | Gunzinger | 712/29 |
| 2003/0212877 A1 | * | 11/2003 | Dally et al. | 712/12 |
| 2005/0177593 A1 | * | 8/2005 | Solomon | 707/102 |

* cited by examiner

*Primary Examiner* — Daniel Pan
(74) *Attorney, Agent, or Firm* — Cantor Colburn LLP; William A. Kinnaman, Jr.

(57) ABSTRACT

The invention provides a communication system including a plurality of communication nodes respectively arranged at predetermined lattice points in lattice space forming a three-dimensional rectangular solid, a communication link that interconnects communication nodes arranged at adjacent lattice points, and a shortcut link that connects, for at least two faces that are not an end face on the lattice space among faces formed of communication nodes of which any adjacent lattice points do not have communication nodes, a communication node constituting one face and a communication node constituting another face.

5 Claims, 10 Drawing Sheets

| COORDINATES OF DESTINATION NODE | TRANSFORMATION EQUATION |
|---|---|
| $x = 1 \sim 2$<br>$y = 3 \sim 4$ | $x' = x$<br>$y' = y$ |
| $x = 1 \sim 2$<br>$y = 1 \sim 2$ | $x' = x$<br>$y' = y$ |
| $x = 3 \sim 4$<br>$y = 1 \sim 2$ | $x' = 5 - y$<br>$y' = x$ |

COMMUNICATION SYSTEM FOR CONTROLLING INTERCOMMUNICATION AMONG A PLURALITY OF COMMUNICATION NODES

CROSS-REFERENCE TO RELATED APPLICATION

This application claims the priority benefit under 35 U.S.C. §119 of Japanese application 2005-351415, filed Dec. 6, 2005, and incorporated herein by reference.

BACKGROUND OF THE INVENTION

1. Field of the Invention

The present invention relates to a communication system. More particularly, the present invention relates to a communication system that controls intercommunication among a plurality of communication nodes.

2. Description of the Related Art

Conventionally, a large-scale parallel computation system has used a torus network. The torus network means a communication network that connects communication nodes arranged next to one another in case that the communication nodes are arranged at lattice points in a lattice space forming a certain three-dimensional shape and further interconnects the communication nodes on end faces facing one another in the three-dimensional space. Conventionally, it has been known that the torus network has the highest efficiency in case that the network is formed on a lattice space of a multi-dimensional square body. That is to say, it is most desirable that the torus network is formed on a square in case of a two-dimensional torus and a cube in case of a three-dimensional torus.

In order to form a communication network on a lattice space of a multidimensional square body, the number of communication nodes is limited to a predetermined number. That is to say, the number of the communication nodes is 64 nodes (4×4×4) or 512 nodes (8×8×8) if the communication network is formed in a three-dimensional space. However, it is impossible to prepare communication nodes of such desired numbers depending on circumstances of a product design, a budget, and an installation area. For this reason, such a case may have low cost-efficiency due to a lowering of communication throughput and a lowering of usage rate of communication link in comparison with a case where communication nodes are arranged on a lattice space of a multidimensional square body.

SUMMARY OF THE INVENTION

Therefore, it is an object of the present invention to provide a communication system, a communication method, and a program, which are capable of overcoming the above drawbacks accompanying the conventional art. The above and other objects can be achieved by combinations described in the independent claims. The dependent claims define further advantageous and exemplary combinations of the present invention.

To solve the problem, according to the present invention, there is provided a communication system including: a plurality of communication nodes; a communication link that interconnects communication nodes arranged at adjacent lattice points in case that the plurality of communication nodes are respectively arranged at predetermined lattice points in a lattice space forming a three-dimensional rectangular solid; and a shortcut link that connects, for at least two faces that are not an end face on the lattice space among faces formed of communication nodes of which any adjacent lattice points do not have communication nodes, a communication node constituting one face and a communication node constituting another face.

The invention also contemplates a communication method in the communication system described above, as well as a program stored on a machine-readable medium and executable by a machine to perform the same. The invention further contemplates a method for providing services connecting communication nodes by means of such a communication system.

The summary of the invention does not necessarily describe all necessary features of the present invention. The present invention may also be a sub-combination of the features described above.

According to the present invention, it is possible to efficiently constitute a communication network consisting of a plurality of communication nodes than ever before.

BRIEF DESCRIPTION OF THE DRAWINGS

The above and other objects and features and advantages of the present invention will become more apparent from the following description of the presently preferred exemplary embodiments of the invention taken in conjunction with the accompanying drawings, in which.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
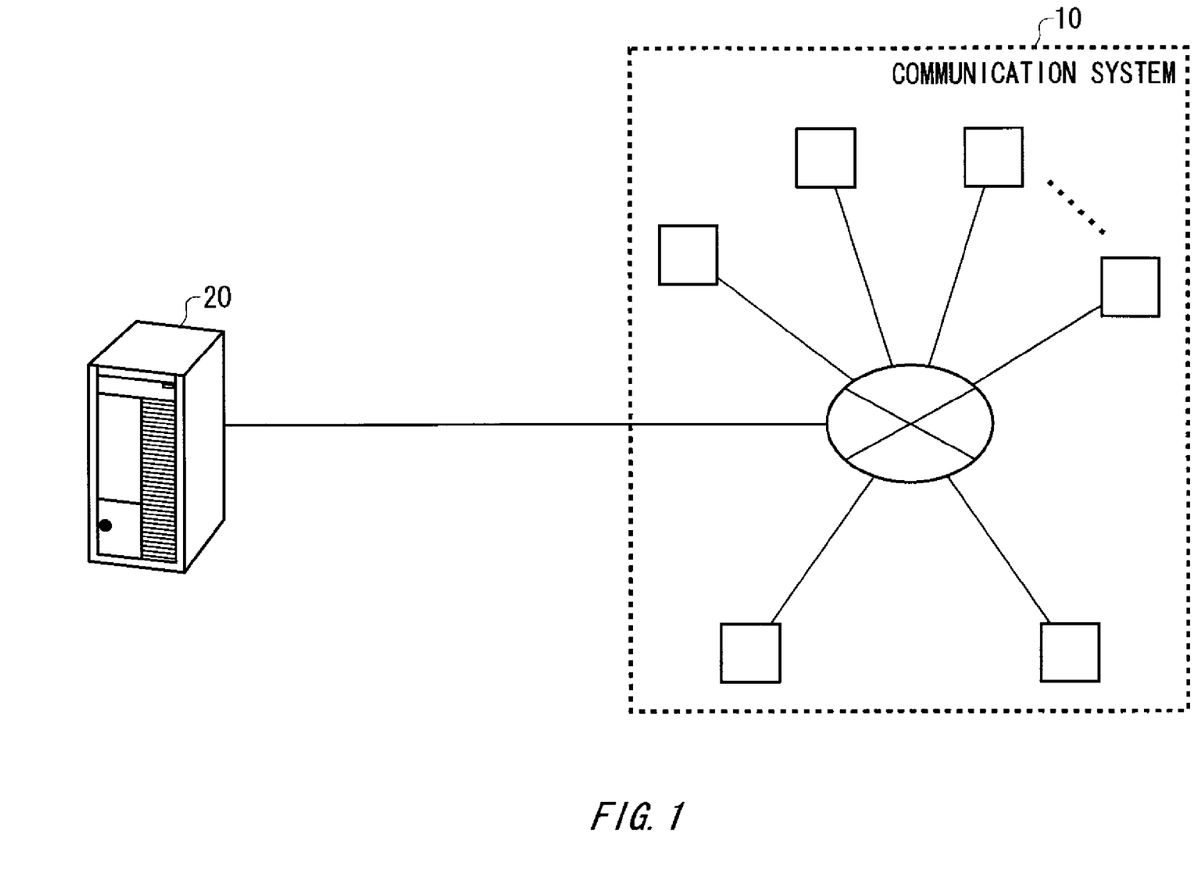
FIG. 1 is a view showing an entire configuration of a communication system and an information processing apparatus.

FIG. 1 is a view showing an entire configuration of a communication system 10 and an information processing apparatus 20. The communication system 10 has a plurality of communication nodes (communication nodes 100-1 to 100-12 in an example to be described below). Then, each of the plurality of communication nodes in the communication system 10 executes a program for numerical computation or the like. The information processing apparatus 20 sends a request for program execution to each communication node in the communication system 10. The execution request includes the number for a communication node that generates an execution result necessary for executing a program of a concerned communication node or the number for a communication node that receives an execution result by the concerned communication node, in addition to processing matter to be executed. That is to say, the communication system 10 concurrently executes a program according to a request from the information processing apparatus 20, and sends back the execution result to the information processing apparatus 20. In this way, it is possible to execute a program much more effectively than when a single communication node executes the program.

Figure 2:
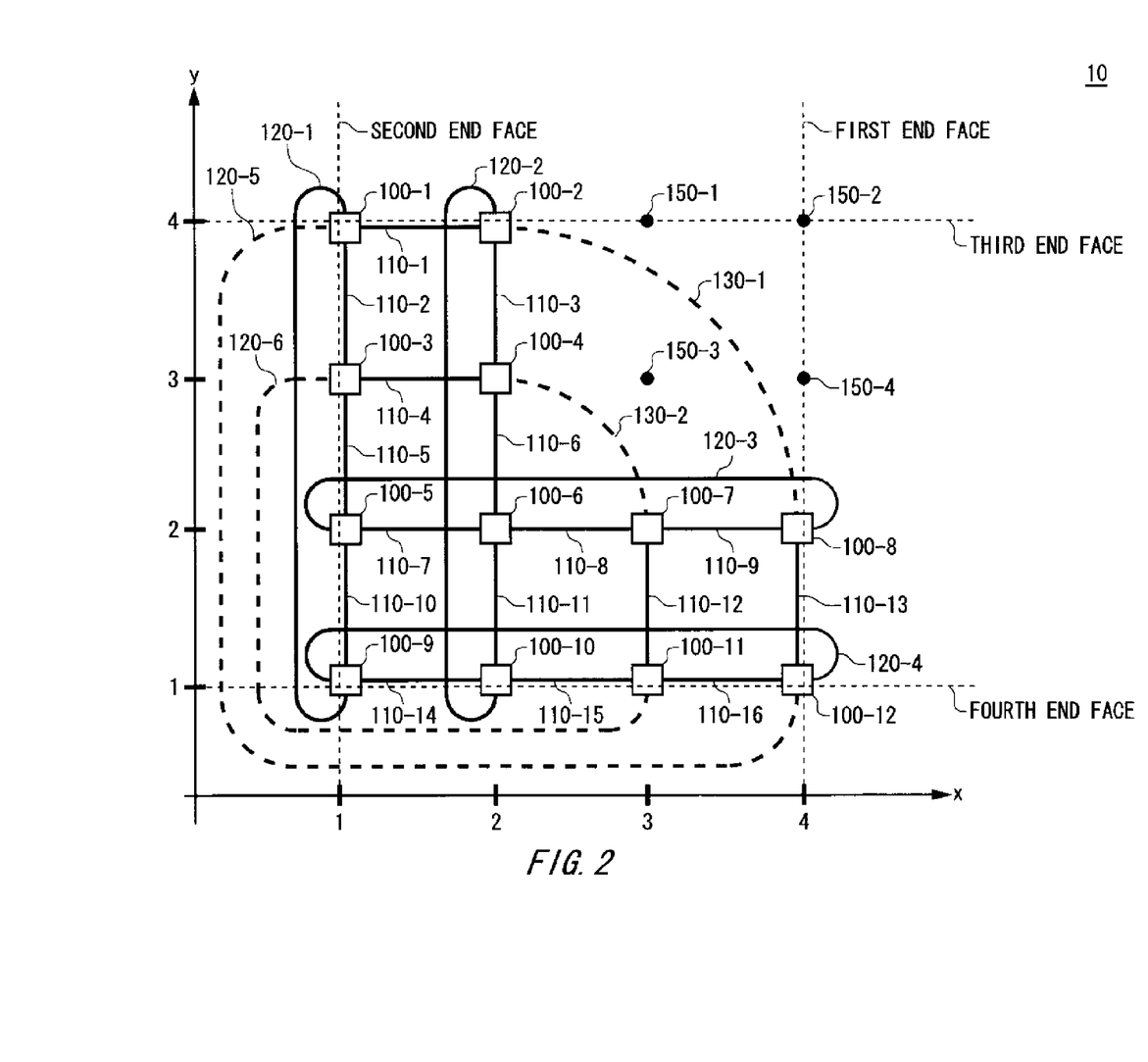
FIG. 2 is a view showing a configuration of a communication system.

FIG. 2 is a view showing a configuration of the communication system 10. The communication system 10 has the communication nodes 100-1 to 100-12, communication links 110-1 to 100-16, loop links 120-1 to 120-6, and shortcut links 130-1 and 130-2. Each of the communication nodes 100-1 to 100-12 executes a program in parallel with the other communication nodes. Each of the communication nodes 100-1 to 100-12 is typically a processor (a CPU, an MPU, or a central processing unit). Alternatively, each of the communication nodes 100-1 to 100-12 may be a storage device such as a hard disk drive, or may be various types of sensors.

In case that the communication nodes 100-1 to 100-12 are respectively arranged at predetermined lattice points in a multidimensional lattice space surrounded by a plurality of end faces, the communication links 110-1 to 110-16 interconnect communication nodes arranged at adjacent lattice points. More specifically, this lattice plane is a square with four lattice points along each dimension, and the communication links 110-1 to 110-16 respectively interconnect communication nodes arranged at lattice points adjacent to each other in case that each of the communication nodes 100-1 to 100-12 is virtually arranged at each of 12 lattice points among a total of 16 lattice points. In addition, the lattice space according to the present invention is not limited to a lattice plane shown in FIG. 2. The lattice space may be a plane surrounded by a plurality of end faces or a plane surrounded by a plurality of line segments. For example, the lattice space may be a lattice plane forming a two-dimensional rectangle, may be a lattice space forming a three-dimensional rectangular solid, or may be a lattice space forming a three-dimensional cube.

The communication nodes 100-1 to 100-12 are respectively arranged at lattice points except for four lattice points (lattice points 150-1 to 150-4) whose x coordinates are 3 or 4 and y coordinates are 3 or 4. Then, the communication link 110-1 interconnects the communication node 100-1 and the communication node 100-2 that are arranged at lattice points adjacent to each other. The communication link 110-2 interconnects the communication node 100-1 and the communication node 100-3 that are arranged at lattice points adjacent to each other. Each of the other communication links 110-3 to 110-16 similarly connects two communication nodes one-to-one.

Each of the loop links 120-1 to 120-4 interconnects communication nodes that are adjacent to each other in case that end faces facing each other in the lattice space are opposed to each other. In an example of the present drawing, each of the loop links 120-1 to 120-4 more specifically interconnects communication nodes that are adjacent to each other in case that the sides facing each other in the square are opposed to each other. That is to say, the loop link 120-1 connects the communication node 100-1 and the communication node 100-9, and the loop link 120-2 connects the communication node 100-2 and the communication node 100-10. Moreover, the loop link 120-3 connects the communication node 100-5 and the communication node 100-8, and the loop link 120-4 connects the communication node 100-9 and the communication node 100-12.

Each of the loop links 120-5 and 120-6 connects one of the communication nodes 100-1 and 100-3 to one of the communication nodes 100-11 and 100-12. In case that a first end face and a second end face facing the first end face in the lattice space are opposed to each other, the communication nodes 100-1 and 100-3 are communication nodes in either of the first end face or the second end face of which the other opposed end face does not have a communication node. Moreover, in case that a third end face and a fourth end face facing the third end face in the lattice space are opposed to each other, the communication nodes 100-11 and 100-12 are communication nodes in either of the third end face or the fourth end face of which the other opposed end face does not have a communication node.

Each of the shortcut links 130-1 and 130-2 connects a communication node constituting one face and a communication node constituting the other face, for a face consisting of the communication nodes 100-2 and 100-4 and a face consisting of the communication nodes 100-7 and 100-8. In addition, in case of an example of the present drawing, since a two-dimensional lattice plane is used, a face consisting of the communication nodes 100-2 and 100-4 means a line segment consisting of the communication nodes 100-2 and 100-4. Moreover, a face consisting of the communication nodes 100-7 and 100-8 means a line segment consisting of the communication nodes 100-7 and 100-8.

Moreover, each of the shortcut links 130-1 and 130-2 connects communication nodes that are adjacent to each other in case that these two line segments are opposed to each other. That is to say, the shortcut link 130-1 connects the communication node 100-2 to the communication node 100-8 and the shortcut link 130-2 connects the communication node 100-4 to the communication node 100-7. These line segments consist of communication nodes of which either of adjacent lattice points does not have a communication node. That is to say, for example, a lattice point adjacent to the communication node 100-2 in a positive direction on an x coordinate does not have a communication node. Moreover, a lattice point adjacent to the communication node 100-4 in a positive direction on an x coordinate does not have a communication node. For this reason, the communication node 100-2 and the communication node 100-4 constitute this line segment. Moreover, a lattice point adjacent to the communication node 100-7 in a positive direction on a y coordinate does not have a communication node. Moreover, a lattice point adjacent to the communication node 100-8 in a positive direction on a y coordinate does not have a communication node. For this reason, the communication node 100-7 and the communication node 100-8 constitute this line segment.

According to the above configuration, all ring-shaped communication lines consisting of the communication link, the shortcut link, and the loop link go through four communication nodes. In this way, assuming that communication traffic volume by each communication node is equal, all communication lines have the same network traffic. As a result, although communication nodes adequate to be arranged at each lattice point in lattice space with a square and a cube cannot be prepared, network traffic flowing into each link can be generally equal. In this way, it is possible to raise a usage rate for each link and thus raise a mean throughput for the number of links.

In addition, a structure shown in the present drawing is an example, and a connection mode between communication nodes has various variations. For example, communication nodes may be respectively arranged at lattice points in a lattice plane forming a rectangle in place of a square. Moreover, in place of a toroidal structure shown in the present drawing, each communication node may be connected by a mesh-shaped communication link except for the loop link. Even in case of such a configuration, it is possible to realize more efficient and high-speed communication than the connection mode that has been conventionally proposed.

Figure 3:
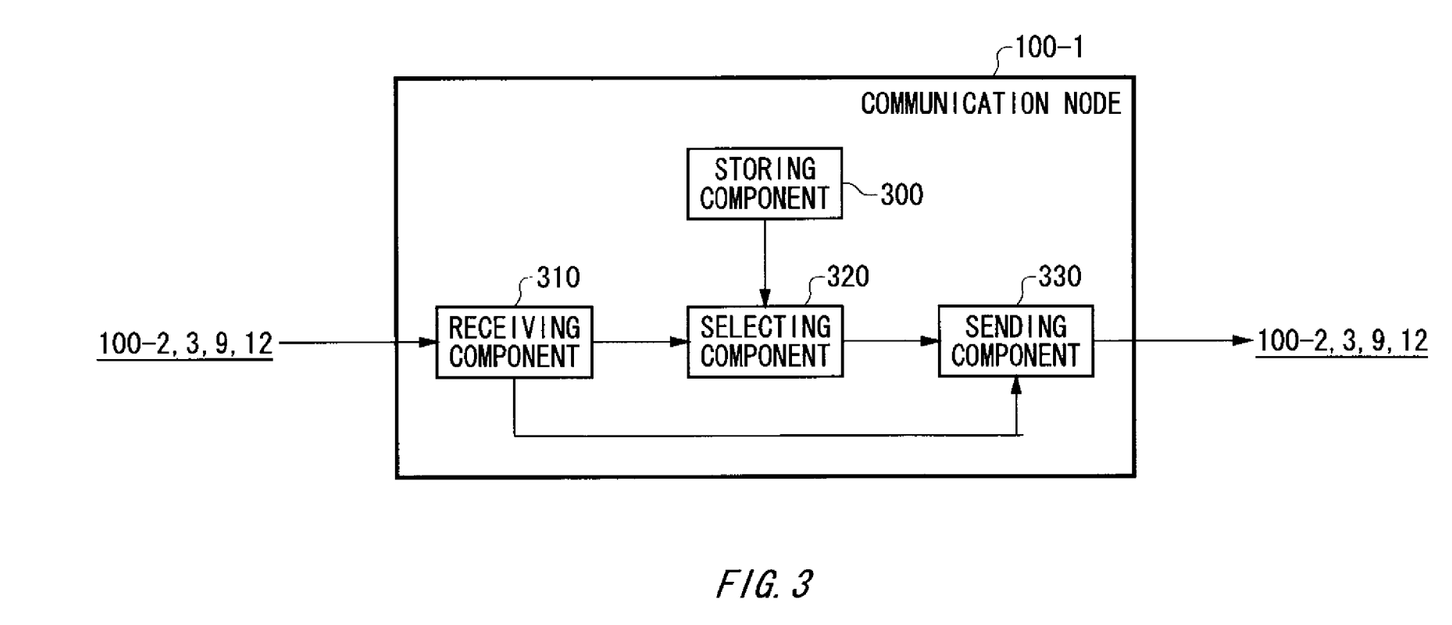
FIG. 3 is a view showing a functional configuration of a communication node.

FIG. 3 is a view showing a functional configuration of the communication node 100-1. In addition, since each of the communication nodes 100-2 to 100-12 has a configuration generally same as that of the communication node 100-1 except for a reception source and a sending destination for a communication packet and the contents of a storing component 300, only the differences will be below described. The communication node 100-1 has the storing component 300, a receiving component 310, a selecting component 320, and a sending component 330. The storing component 300 stores information showing topology of a communication path reaching each of the other communication nodes from the communication node 100-1 via the communication links 110-1 to 110-16, the loop links 120-1 to 120-6, and the shortcut links 130-1 and 130-2. A further detailed example will be shown in FIG. 4.

Figure 4:
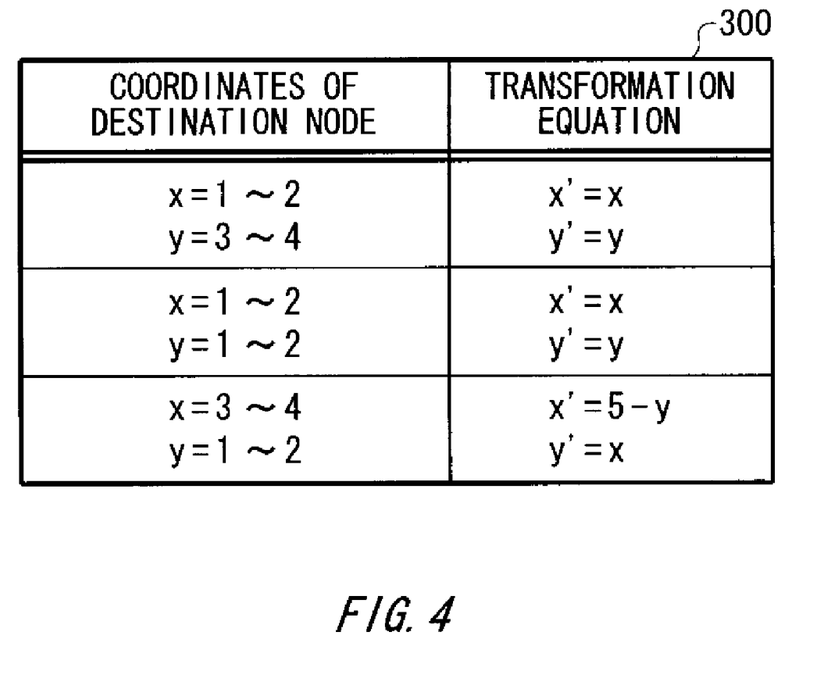
FIG. 4 is an exemplary view showing a data structure of a storing component.

FIG. 4 is an exemplary view showing a data structure of the storing component 300. The storing component 300 stores a transformation rule transforming a communication node in case that the communication node included in a block is a destination, in association with each of a plurality of predetermined blocks obtained by dividing the lattice space. In an example of the present drawing, the storing component 300 stores a range of coordinates of a destination node as information showing each block. That is to say, for example, a set of communication nodes, of which an x coordinate is 1 to 2 and a y coordinate is 3 to 4, means one block. Moreover, in an example of the present drawing, the storing component 300 stores a transformation equation of coordinates as a transformation rule. In this transformation equation, x and y show coordinates before transformation and x' and y' show coordinates after transformation. Since coordinates before transformation are coordinates being designated by the information processing apparatus 20 or other outside application programs, the coordinates are referred to as a global address. Moreover, since coordinates after transformation are coordinates being temporarily used by the communication node 100-1 by transformation, the coordinates are referred to as a local address.

As a specific example, an x coordinate and a y coordinate are not transformed in case that communication nodes of which the x coordinate is 1 to 2 and the y coordinate is 3 to 4 are a destination. Moreover, an x coordinate and a y coordinate are not transformed in case that communication nodes of which the x coordinate is 1 to 2 and the y coordinate is 1 to 2 are a destination. On the other hand, a y coordinate is transformed into the same value as an original x coordinate and an x coordinate is transformed into a value obtained by subtracting an original y coordinate from 5 in case that communication nodes of which the x coordinate is 3 to 4 and the y coordinate is 1 to 2 are a destination.

In addition, a structure of the present drawing is an example, and a data structure of the storing component 300 may have various variations. For example, the storing component 300 may store a transformation rule only for coordinates requiring transformation. That is to say, the storing component 300 may store a transformation rule only for coordinates of which an x coordinate is 3 to 4 and a y coordinate is 1 to 2, corresponding to the third line in FIG. 4. In this case, the receiving component 310 to be described below applies the transformation rule only to the coordinates and does not apply the transformation rule to other coordinates. As further another example, the storing component 300 may store a translation table transforming each coordinate one-to-one.

FIG. 3 is referred to once more. The receiving component 310 receives a communication packet in association with a destination of the communication packet. The receiving component 310 receives a global address that is a coordinate value in case that a destination communication node is arranged in lattice space as a destination of a communication packet. That is to say, for example, if a destination is the communication node 100-5, the receiving component 310 receives coordinates (1, 2) as a global address. In addition, the receiving component 310 may receive communication packets from other communication nodes (for example, the communication nodes 100-2, 100-3, 100-9, and 100-12), or may receive communication packets from an outside apparatus such as the information processing apparatus 20. The selecting component 320 selects a destination communication node to which a communication packet is transferred next to the communication node 100-1 on a communication path reaching the received destination, based on information stored on the storing component 300. Specifically, the selecting component 320 transforms a global address into a local address by means of a transformation rule corresponding to a block including the received global address. Then, the selecting component 320 selects a destination communication node to which a communication packet is transferred next to the communication node 100-1 on a communication path reaching the local address from the communication node 100-1.

As a specific example, in case that a destination is the communication node 100-8, the selecting component 320 transforms a global address (4, 2) into a local address (3, 4). Then, the selecting component 320 selects the communication node 100-2 as a destination communication node to which a communication packet is transferred next to the communication node 100-1 on a communication path reaching the local address (3, 4) from (1, 4), that is, the coordinates of the communication node 100-1. In case that a communication packet is sent from the communication node 100-1 to the communication node 100-8, a short route is a route sequentially transferring the packet through the communication node 100-1, the communication node 100-2, and the communication node 100-8. In case that a sender and a destination are given in a torus network, since a technique specifying a communication path has been conventionally known, the description is omitted.

The sending component 330 sends a communication packet to a communication node selected by the selecting component 320 via a communication link, a shortcut link, or a loop link.

Figure 5:
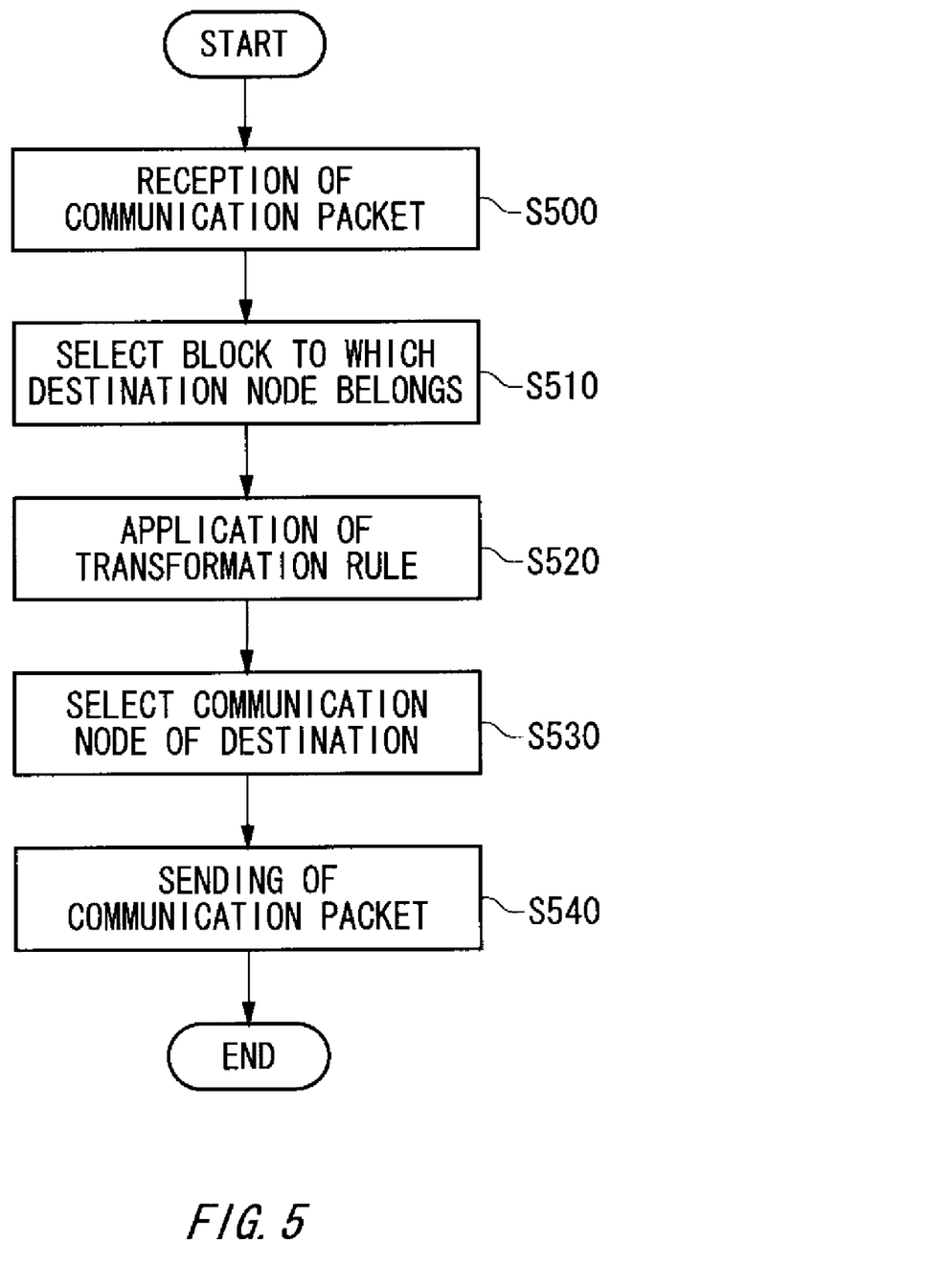
FIG. 5 is a view showing a flow of a process by which a communication node transfers a communication packet.

FIG. 5 is a view showing a flow of a process by which the communication node 100-1 transfers a communication packet. The receiving component 310 receives a communication packet in association with a destination of the communication packet (S500). The receiving component 310 may receive a global address that is a coordinate value in case that a destination communication node is arranged in lattice space, as the destination of the communication packet. The selecting component 320 selects a block to which the received global address belongs (S510). Then, the selecting component 320 transforms the global address into a local address by means of a transformation rule corresponding to the block (S520). The application of this transformation rule is realized by simple computation by, e.g., a linear function as shown in FIG. 4. That is to say, an overhead for this part is extremely vanishingly small. Next, the selecting component 320 selects a destination communication node to which the communication packet is transferred next to the communication node 100-1 on a communication path reaching the local address from the communication node 100-1 (S530). Then, the sending component 330 sends the communication packet to the communication node selected by the selecting component 320 (S540).

Figure 6:
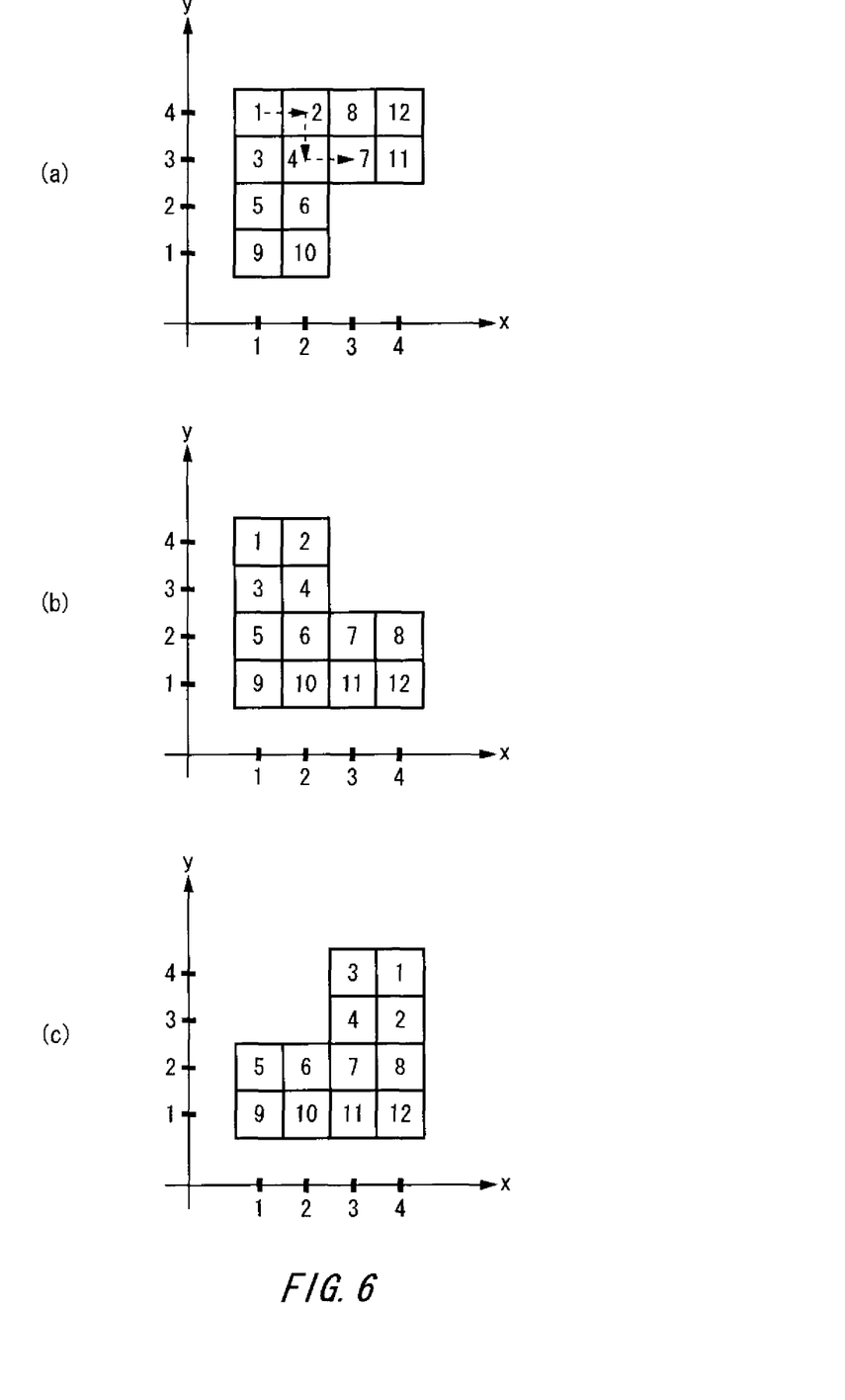
FIG. 6 is a view showing a conceptual diagram of a transformation rule transforming a global address into a local address.

FIG. 6 is a conceptual diagram showing a transformation rule transforming a global address into a local address. FIG. 6(a) shows a conceptual diagram for a transformation rule stored on the storing component 300 of each of the communication nodes 100-1 to 100-4, FIG. 6(b) shows a conceptual diagram for a transformation rule stored on each of the communication nodes 100-5 and 100-6 and the communication nodes 100-9 and 100-10, and FIG. 6(c) shows a conceptual diagram for a transformation rule stored on each of the communication nodes 100-7 and 100-8 and the communication nodes 100-11 and 100-12. In these drawings, a natural number N shows a communication node 100-N. That is to say, a number 1 shows the communication node 100-1, a number 2 shows the communication node 100-2, and the subsequent numbers show communication nodes having the same numbers.

In detail, in case that the communication nodes 100-1 to 100-4 receive a communication packet of which a destination is a certain communication node, the selecting component 320 transforms a global address of the communication node that is a destination into a local address shown in FIG. 6(a). Similarly, in case that the communication nodes 100-5 and 100-6 or the communication nodes 100-9 and 100-10 receive a communication packet of which a destination is a certain communication node, the selecting component 320 transforms a global address of the communication node that is a destination into a local address shown in FIG. 6(b). In reality, since a local address shown in FIG. 6(b) is equal to a global address shown in FIG. 2, transformation is not performed in the communication nodes 100-5 and 100-6 and the communication nodes 100-9 and 100-10. Similarly, in case that the communication nodes 100-7 and 100-8 or the communication nodes 100-11 and 100-12 receive a communication packet of which a destination is a certain communication node, the selecting component 320 transforms a global address of the communication node that is a destination into a local address shown in FIG. 6(c).

The present drawing explains an example of a process by which a communication packet is sequentially transferred through communication nodes to arrive at a destination. In this example, it is assumed that the communication node 100-1 sends a communication packet using the communication node 100-7 as a destination. A global address for the communication node 100-7 that is a destination is (x, y)=(3, 2) as shown in FIG. 2. First, the selecting component 320 of the communication node 100-1 transforms this global address into (x, y)=(3, 3) that is the local address shown in FIG. 6(a).

The selecting component 320 selects a communication node to which the communication packet is transferred next to the communication node 100-1 on a communication path facing the local address (3, 3) from the communication node 100-1. As a concrete process, the selecting component 320 computes, e.g., a differential value of the local address (3, 3) of the communication node 100-7 to the global address (1, 4) of the communication node 100-1. That is to say, a differential value ($\Delta x$, $\Delta y$) becomes (2, −1).

The destinations to which the communication node 100-1 transfers a communication packet are communication nodes located in positive and negative directions of each of x and y coordinates, i.e., the four communication nodes 100-9, 100-12, 100-2, and 100-3. The selecting component 320 selects a communication node located in a direction reducing an absolute value of this differential value, among these communication nodes. For example, in order to reduce a differential value of an x coordinate, the selecting component 320 selects the communication node 100-2 located in a positive direction of an x-axis direction as a destination. Alternatively, the selecting component 320 may select the communication node 100-3 located in a negative direction of a y-axis direction as a destination. Then, the sending component 330 sends the communication packet to the selected communication node 100-2.

The communication node 100-2 that receives the communication packet computes a differential value between (2, 4) that is a global address of the communication node 100-2 and (3, 3) that is a local address of the communication node 100-7. That is to say, the differential value ($\Delta x$, $\Delta y$) becomes (1, −1). The selecting component 320 selects a communication node located in a direction reducing an absolute value of this differential value, among the communication nodes located in positive and negative directions of each of x and y coordinates. For example, in order to reduce a differential value of a y coordinate, the selecting component 320 selects the communication node 100-4 located in a negative direction of a y-axis direction as a destination. Then, the sending component 330 sends the communication packet to the selected communication node 100-4.

The communication node 100-4 that receives the communication packet computes a differential value between (2, 3) that is a global address of the communication node 100-4 and (3, 3) that is a local address of the communication node 100-7. That is to say, the differential value ($\Delta x$, $\Delta y$) becomes (1, 0). The selecting component 320 selects a communication node located in a direction reducing an absolute value of this differential value, among the communication nodes located in positive and negative directions of each of x and y coordinates. For example, in order to reduce a differential value of an x coordinate, the selecting component 320 selects the communication node 100-7 located in a positive direction of an x-axis direction. Then, the sending component 330 sends the communication packet to the selected communication node 100-7 via the shortcut link 130-2 connected in a positive direction of an x-axis direction.

As above, as described with reference to FIG. 6, the storing component 300 of each communication node stores a transformation rule transforming coordinates of a communication node in case that the communication node included in a block is a destination, in association with each of a plurality of predetermined blocks obtained by dividing lattice space. Each of the communication nodes can appropriately select a communication node to which a communication packet is next transferred in order to make the communication packet arrive at the selected node through the shortest route, by means of this transformation rule.

Figure 7:
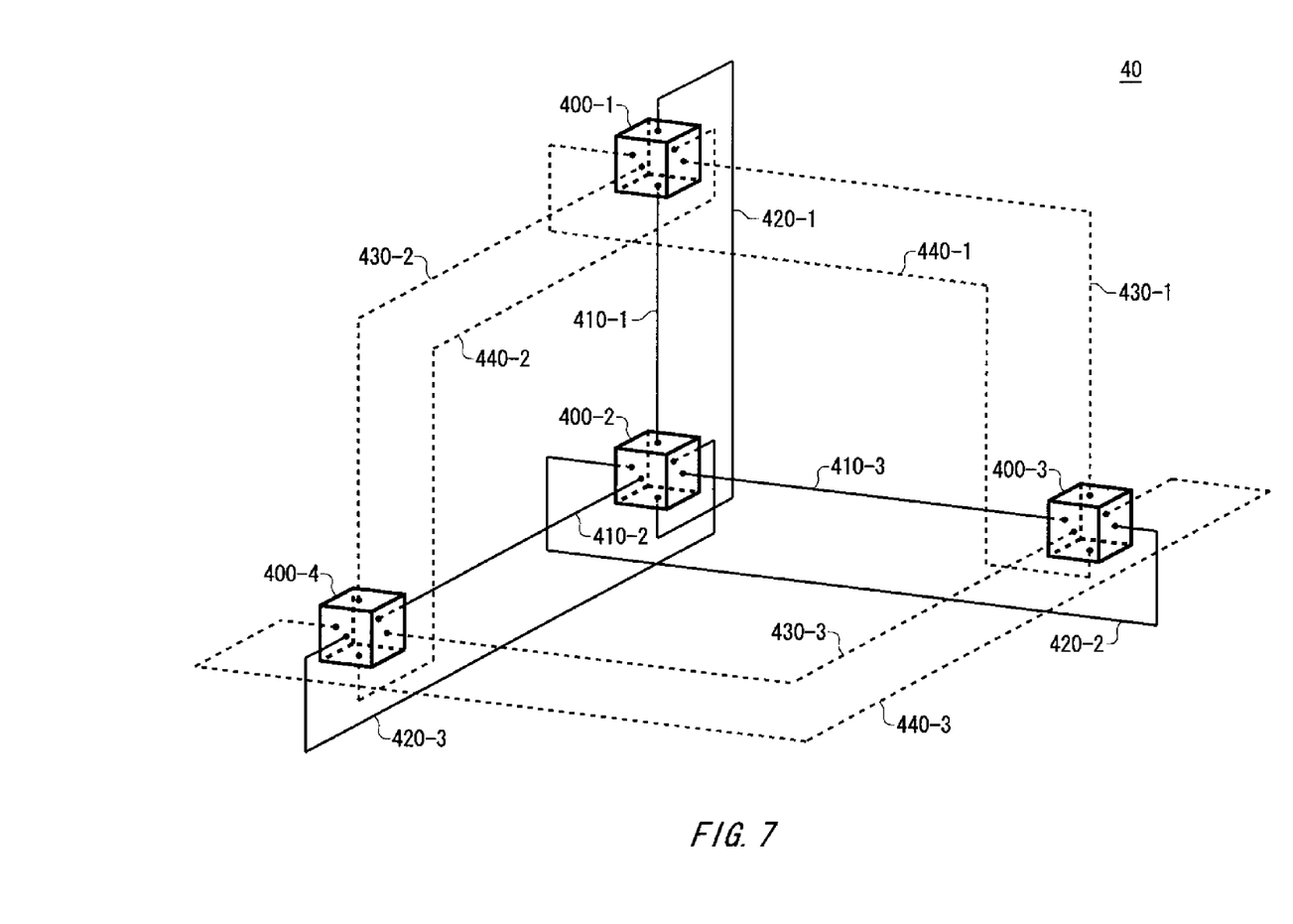
FIG. 7 is a view showing a configuration of a communication system according to an alternative example of the present embodiment.
Figure 8:
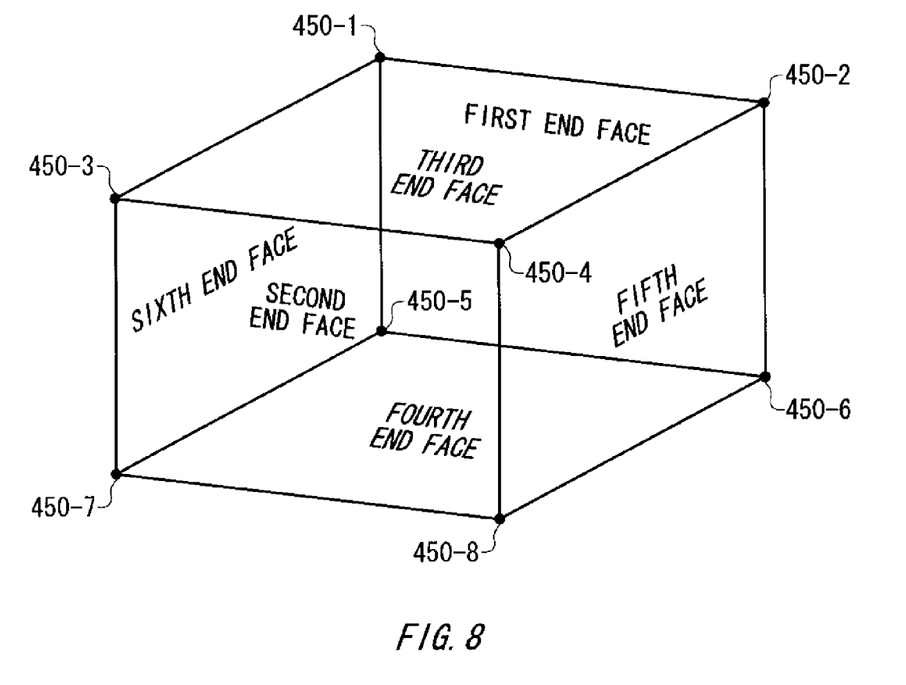
FIG. 8 is a view showing a lattice space in which communication nodes are arranged in the alternative example.

FIG. 7 is a view showing a configuration of a communication system 40 that is an alternative example of the present embodiment. The communication system 40 shown in this alternative example constitutes a three-dimensional torus. FIG. 8 is a view showing a lattice space in which communication nodes 400-1 to 400-4 are arranged in the alternative example. The communication system 40 has the communication nodes 400-1 to 400-4, communication links 410-1 to 410-3, loop links 420-1 to 420-3, shortcut links 430-1 to 430-3, and loop links 440-1 to 440-3. Each of the communication nodes 400-1 to 400-4 mutually communicates with the other communication nodes. In case that the communication nodes 400-1 to 400-4 are respectively arranged at predetermined lattice points in lattice space forming a cube, each of the communication links 410-1 to 410-3 interconnects communication nodes arranged at lattice points adjacent to each other. In the present alternative example, it is assumed that the loop link 440-1 is arranged at a lattice point 450-1, the loop link 440-2 is arranged at a lattice point 450-5, the loop link 440-3 is arranged at a lattice point 450-6, and a loop link 440-4 is arranged at a lattice point 450-7. In addition, communication nodes are not arranged at lattice points 450-2 to 450-4 and a lattice point 450-8.

The communication link 410-1 connects the communication node 400-1 and the communication node 400-2, the communication link 410-2 connects the communication node 400-2 and the communication node 400-4, and the communication link 410-3 connects the communication node 400-2 and the communication node 400-3. Each of the loop links 420-1 to 420-3 interconnects communication nodes that are adjacent to each other in case that end faces facing each other in the lattice space are opposed to each other. Specifically, the loop link 420-1 connects the communication node 400-1 and the communication node 400-2, the loop link 420-2 connects the communication node 400-2 and the communication node 400-3, and the loop link 420-3 connects the communication node 400-2 and the communication node 400-4.

Each of the shortcut links 430-1 to 430-3 connects, for at least two faces that are not an end face on the lattice space among faces formed of communication nodes of which any adjacent lattice points do not have communication nodes, each of communication nodes constituting one face and each of communication nodes constituting another face. Specifically, a communication node is not arranged at the lattice point 450-3 adjacent to the communication node 400-1. Moreover, a communication node is not arranged at the lattice point 450-3 adjacent to the communication node 400-4. For this reason, the shortcut link 430-2 connects, for a face formed of the communication node 400-1 and a face formed of the communication node 400-4, each communication node (in this case, only the communication node 400-1) constituting one face and each communication node (in this case, only the communication node 400-4) constituting the other face. Similarly, the shortcut link 430-1 connects the communication node 400-1 and the communication node 400-4 adjacent to the lattice point 450-2. Moreover, the shortcut link 430-3 connects the communication node 400-4 and the communication node 400-3 adjacent to the lattice point 450-8.

Each of the loop links 440-1 to 440-3 connects a communication node in either of a first end face or a second end face of which the other opposed end face does not have a communication node in case that the first end face and the second end face facing the first end face are opposed to each other in the latter space, to a communication node in either of a third end face or a fourth end face of which the other opposed end face does not have a communication node in case that the third end face and the fourth end face facing the third end face are opposed to each other in the latter space. For example, in case that the first end face and the second end face facing the first end face are opposed to each other in the lattice space, the communication node 400-1 faces the lattice point 450-3 that does not have a communication node. Moreover, in case that the third end face and the fourth end face facing the third end face are opposed to each other in the lattice space, the communication node 400-4 faces the lattice point 450-3 that does not have a communication node. For this reason, the loop link 440-2 connects the communication node 400-1 and the communication node 400-4. Hereinafter, similarly, the loop link 440-1 connects the communication node 400-1 and the communication node 400-3, and the loop link 440-3 connects the communication node 400-3 and the communication node 400-4.

As above, in a three-dimensional structure of the present drawing, a ring-shaped communication line consisting of communication links, shortcut links and/or loop links goes through two communication nodes all the time. In this way, assuming that communication traffic volume by each communication node is equal, any communication lines have the same network traffic. In this way, network traffic flowing into each link can be equal even though communication nodes adequate to be arranged at each lattice point in multidimensional square space cannot be provided.

In addition, as a simple configuration for convenience of description, the present drawing has explained three-dimensional lattice space in which the number of lattice points arranged at each axis, i.e., longitudinal/transversal/altitudinal axes, is two. However, the number of lattice points arranged at each axis is not limited to two. For example, lattice points not less than three may be arranged at each axis of longitudinal/transversal/altitudinal axes, or the number of lattice points arranged at each axis may be different from one another. Moreover, each communication node shown in the present drawing may further have a plurality of communication nodes therein. For example, each communication node shown in the present drawing may constitute a mesh type network of 4×4×4. In this case, each communication link interconnects 4×4 communication nodes arranged on a face of each communication node. Although any of such various configurations is adopted, it is possible to make each communication node effectively communicate with the other communication nodes and thus raise a communication throughput than ever before.

Moreover, in the present alternative example, each of the communication nodes 400-1 to 400-4 has the generally same configuration as that of the communication node 100-1 shown in FIG. 3. That is to say, each of the communication nodes 400-1 to 400-4 has the storing component 300, the receiving component 310, the selecting component 320, and the sending component 330. The storing component 300 stores a transformation rule transforming a global address in three-dimensional coordinate space into a local address in three-dimensional space unlike with an example of FIG. 4. Moreover, the receiving component 310 receives a communication packet from a communication node adjacently arranged among the communication nodes 400-1 to 400-4 or a communication node connected by a shortcut link and a loop link. Moreover, the selecting component 320 selects a destination communication node from a communication node adjacently arranged among the communication nodes 400-1 to 400-4 or a communication node connected by a shortcut link and a loop link. Since the other configurations of the communication nodes 400-1 to 400-4 are generally equal to those of the embodiment shown in FIGS. 2 to 5, their descriptions will be omitted.

Figure 9:
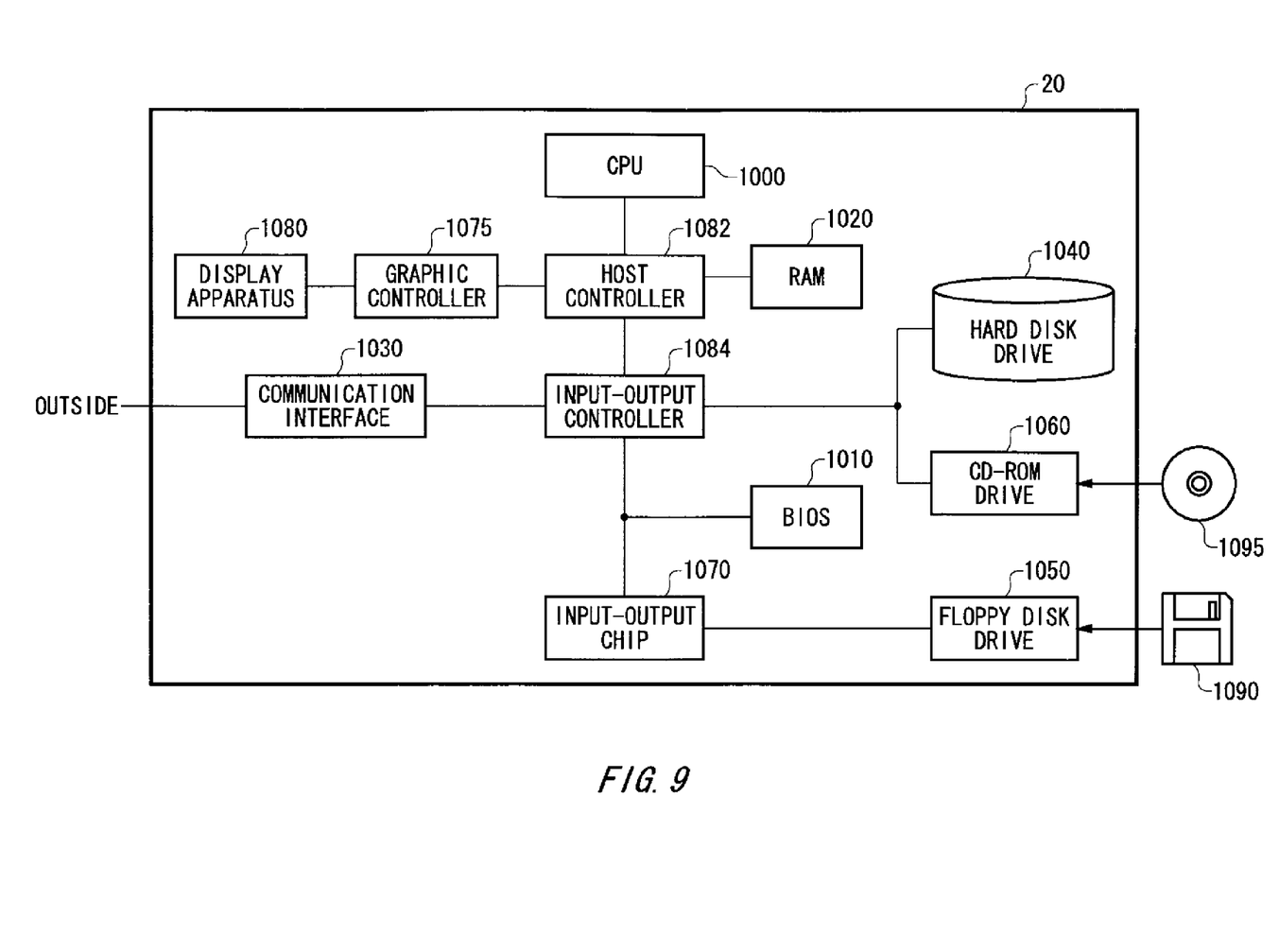
FIG. 9 is an exemplary view showing a hardware configuration of an information processing apparatus.

FIG. 9 is an exemplary view showing a hardware configuration of the information processing apparatus 20. The information processing apparatus 10 includes a CPU peripheral section having a CPU 1000, a RAM 1020, and a graphic controller 1075 that are connected to one another by a host controller 1082, an input-output section having a communication interface 1030, a hard disk drive 1040, and a CD-ROM drive 1060 that are connected to the host controller 1082 by an input-output controller 1084, and a legacy input-output section having a BIOS 1010, a floppy disk drive 1050, and an input-output chip 1070 that are connected to the input-output controller 1084.

The host controller 1082 connects the RAM 1020 to the CPU 1000 and the graphic controller 1075 for accessing the RAM 1020 at high transfer rate. The CPU 1000 operates based on a program stored on the BIOS 1010 and the RAM 1020 to control each section. The graphic controller 1075 acquires image data generated by the CPU 1000 on a frame buffer provided in the RAM 1020, and displays the data on the display apparatus 1080. Alternatively, the graphic controller 1075 may include therein the frame buffer storing the image data generated from the CPU 1000.

The input-output controller 1084 connects the host controller 1082 to the communication interface 1030, the hard disk drive 1040, and the CD-ROM drive 1060 that are a comparatively fast input-output apparatus. The communication interface 1030 communicates with outside apparatuses via a network. The hard disk drive 1040 stores a program and data to be used by the information processing apparatus 20. The CD-ROM drive 1060 reads a program or data from a CD-ROM 1095, and provides the program or data to the RAM 1020 or the hard disk drive 1040.

Moreover, the BIOS 1010, the floppy disk drive 1050, and the input-output chip 1070 that are a comparatively low-speed input-output apparatus are connected to the input-output controller 1084. The BIOS 1010 stores a boot program to be executed by the CPU 1000 during starting the information processing apparatus 20, a program dependent on hardware of the information processing apparatus 20, or the like. The floppy disk drive 1050 reads a program or data from a floppy disk 1090, and provides the program or data to the RAM 1020 or the hard disk drive 1040 via the input-output chip 1070. The input-output chip 1070 connects various kinds of input-output apparatuses via the floppy disk 1090, a parallel port, a serial port, a keyboard port, a mouse port, or the like.

A program provided to the information processing apparatus 20 is stored on a recording medium such as the floppy disk 1090, the CD-ROM 1095, or an IC card in order to be provided by a user. The program is read from the recording medium via the input-output chip 1070 and the input-output controller 1084 to be installed and executed in the communication system 10 or the communication system 40 via the communication interface 1030. Since operations performed by working on the communication system 10 or the communication system 40 or the like by the program are the same as those by the communication system 10 or the communication system 40 described in FIGS. 1 to 8, their descriptions will be omitted.

A program described above may be stored on an outside storage medium. A storage medium can include an optical recording medium such as a DVD and a PD, a magneto-optical recording medium such as an MD, a tape medium, a semiconductor memory such as an IC card in addition to the floppy disk 1090 and the CD-ROM 1095. Moreover, a storage device such as a hard disk or RAM provided in a server system connected to a private communication network and Internet may be used as a recording medium to provide a program to the information processing apparatus 20 via a network.

Figure 10:
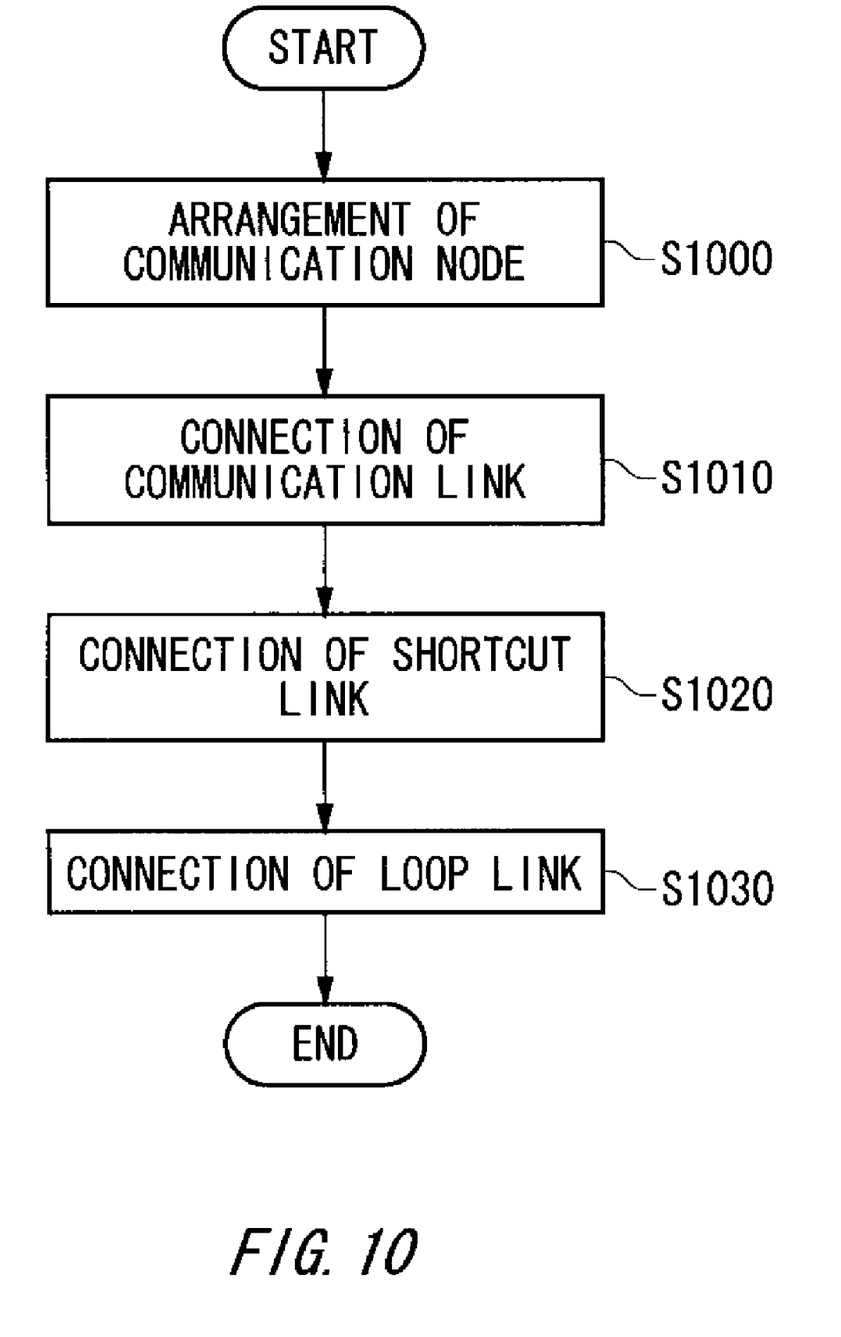
FIG. 10 is an exemplary view showing a flow of a process by which a communication system is mounted.

FIG. 10 is an exemplary view showing a flow of a process by which the communication system 10 or the communication system 40 is mounted. An engineer mounting the communication system 10 or the communication system 40 arranges a plurality of communication nodes (for example, the communication node 100-1 and the communication node 400-1) (S1000). Next, the engineer connects communication links to each communication node (S1010). Specifically, the engineer interconnects communication nodes arranged at adjacent lattice points in case that the plurality of communication nodes are respectively arranged at predetermined lattice points in lattice space forming a multidimensional rectangular solid.

Moreover, the engineer connects shortcut links to each communication node (S1020). Specifically, the engineer connects, for at least two faces that are not an end face on the lattice space among faces formed of communication nodes of which any adjacent lattice points do not have communication nodes, a communication node constituting one face and a communication node constituting another face. Next, the engineer connects loop links to each communication node (S1030). Specifically, the engineer interconnects communication nodes that are adjacent to each other in case that end faces facing each other in the lattice space are opposed to each other. Moreover, the engineer connects a communication node not adjacent to other communication nodes in case that a first end face and a second end face facing the first end face are opposed to each other in the latter space, to a communication node not adjacent to other communication nodes in case that a third end face and a fourth end face facing the third end face are opposed to each other in the latter space.

As above, according to the present embodiment and the alternative example, although communication nodes adequate to constitute a rectangular solid and a cube cannot be provided, it is possible to reduce waste of communication links by appropriately connecting communication nodes and thus improve a communication throughput. Moreover, when communication nodes are arranged in lattice space of multidimensional square space such as a square and a cube, the number of communication nodes arranged on a ring-shaped communication line can be made equal, and thus network traffic of each communication link can be made equal. In this case, similarly to the case that communication nodes are arranged at all lattice points in square space, it is possible to provide ideal communication environment utilizing a performance of each communication link at a maximum.

Although the present invention has been described by way of exemplary embodiments, it should be understood that those skilled in the art might make many changes and substitutions without departing from the spirit and the scope of the present invention which is defined only by the appended claims.

What is claimed is:

1. A communication system comprising:
   a plurality of communication nodes respectively arranged at predetermined lattice points in a multidimensional lattice space surrounded by a plurality of end faces, each end face located at an outer periphery of the multidimensional lattice space;
   a communication link that interconnects communication nodes arranged at adjacent lattice points; and
   a shortcut link that connects communication nodes arranged at non-adjacent lattice points and located in two faces that are not an end face on the lattice space, wherein no other communication nodes are arranged between the shortcut link connected communication nodes and one of the end faces;
   wherein each of said plurality of communication nodes comprises:
   a storing component that stores a transformation rule transforming coordinates of a destination communication node in a block, in association with each of a plurality of predetermined blocks obtained by dividing the lattice space;

a receiving component that receives a global address that is a coordinate value of a destination communication node arranged in the lattice space, in association with a communication packet, as a destination of the communication packet;

a selecting component that transforms the global address into a local address according to a transformation rule corresponding to the block to which the received global address belongs and selects a destination communication node to which the communication packet is transferred next to the communication node on a communication path from the communication node to the local address; and a sending component that sends the communication packet to the selected communication node via said communication link or said shortcut link.

2. The communication system as claimed in claim 1, wherein the lattice space forms a three-dimensional rectangular solid.

3. The communication system as claimed in claim 2, wherein the three-dimensional rectangular solid is a three-dimensional cube in which the numbers of lattice points on each coordinate axis are equal.

4. The communication system as claimed in claim 1, further comprising:

a loop link that interconnects communication nodes that are adjacent to each other if end faces facing each other in the lattice space are opposed to each other; and a loop link that connects a communication node in either of a first end face or a second end face of which the other opposed end face does not have a communication node if the first end face and the second end face facing the first end face are opposed to each other in the lattice space, to a communication node in either of a third end face or a fourth end face of which the other opposed end face does not have a communication node if the third end face and the fourth end face facing the third end face are opposed to each other in the lattice space.

5. The communication system as claimed in claim 1, wherein said plurality of communication nodes are respectively arranged at predetermined lattice points on a lattice plane forming a square in the lattice space, and said shortcut link connects, for at least two line segments within the lattice plane formed of communication nodes of which any adjacent lattice points do not have communication nodes, each of communication nodes constituting one line segment and each of communication nodes constituting another line segment.

* * * * *